US010037177B2

(12) United States Patent
Yamaguchi

(10) Patent No.: US 10,037,177 B2
(45) Date of Patent: Jul. 31, 2018

(54) IMAGE FORMING SYSTEM, POST PROCESSING APPARATUS AND NON-TRANSITORY COMPUTER-READABLE STORAGE MEDIUM STORING PROGRAM FOR INFORMATION PROCESSING APPARATUS

(71) Applicant: Konica Minolta, Inc., Tokyo (JP)

(72) Inventor: Shotaro Yamaguchi, Kokubunji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/435,900

(22) Filed: Feb. 17, 2017

(65) Prior Publication Data
US 2017/0242637 A1 Aug. 24, 2017

(30) Foreign Application Priority Data

Feb. 19, 2016 (JP) ................. 2016-030075

(51) Int. Cl.
*G06F 3/12* (2006.01)
*G06K 15/00* (2006.01)
(52) U.S. Cl.
CPC .......... *G06F 3/1217* (2013.01); *G06F 3/1205* (2013.01); *G06F 3/1262* (2013.01); *G06F 3/1264* (2013.01); *G06F 3/1296* (2013.01); *G06K 15/4025* (2013.01); *G06K 2215/0082* (2013.01)
(58) Field of Classification Search
CPC .... G06F 3/1205; G06F 3/1217; G06F 3/1262; G06F 3/1264; G06F 3/1296; G06K 15/4025; G06K 2215/0082

USPC ......................................... 358/1.15
See application file for complete search history.

(56) References Cited

U.S. PATENT DOCUMENTS

2009/0043502 A1* 2/2009 Shaffer .................. G01C 21/20
701/469
2015/0378652 A1* 12/2015 Sakurai .............. H04N 1/00307
358/1.15

FOREIGN PATENT DOCUMENTS

JP 2006092361 A * 4/2006
JP 2006-321583 11/2006
JP 2006321583 A * 11/2006
JP 2011-079250 4/2011

* cited by examiner

*Primary Examiner* — Neil R McLean
(74) *Attorney, Agent, or Firm* — Baker & Hostetler LLP

(57) ABSTRACT

An object is to use a post processing apparatus effectively and to shorten execution waiting time of a print job of a user due to moving of a self-traveling post processing apparatus. In an image forming system including a self-traveling post processing apparatus which separably connects with each of a plurality of image forming apparatuses, in a case of having received a print job which is executed by any of the plurality of image forming apparatuses and performs the post processing by the post processing apparatus, the post processing apparatus is made to self-travel by a traveling section such that the post processing apparatus moves toward an image forming apparatus which has received a print job which performs post processing.

15 Claims, 11 Drawing Sheets

PRINT JOB RECEIVED BY IMAGE FORMING APPARATUS 100b (S301)

| JOB NO. | POST PROCESSING |
|---|---|
| PRINT JOB 1 | NO |
| PRINT JOB 2 | NO |
| PRINT JOB 3 | NO |

PRINT JOB RECEIVED BY OTHER IMAGE FORMING APPARATUS 100a (S302)

| JOB NO. | POST PROCESSING |
|---|---|
| PRINT JOB 1 | NO |
| PRINT JOB 2 | NO |
| PRINT JOB 3 | YES |

FIG.11A

EXECUTION QUEUE OF IMAGE FORMING APPARATUS 100a (S101)

| JOB NO. | POST PROCESSING | STATUS |
|---|---|---|
| PRINT JOB 1 | NO | WAIT |
| PRINT JOB 2 | NO | WAIT |
| PRINT JOB 3 | YES | WAIT |

FIG.11B

EXECUTION QUEUE OF IMAGE FORMING APPARATUS 100b (S402)

| JOB NO. | POST PROCESSING | STATUS |
|---|---|---|
| PRINT JOB 4 | NO | WAIT |
| PRINT JOB 5 | YES | WAIT |

FIG.11C

POST PROCESSING APPARATUS (S104)

| STATUS |
|---|
| BEING MOVING TOWARD IMAGE FORMING APPARATUS 100a |

FIG.12A

EXECUTION QUEUE OF IMAGE FORMING APPARATUS 100a (AT THE TIME OF S404)

| JOB NO. | POST PROCESSING | STATUS |
|---|---|---|
| PRINT JOB 1 | NO | COMPLETION |
| PRINT JOB 2 | NO | WAIT |
| PRINT JOB 3 | YES | WAIT |

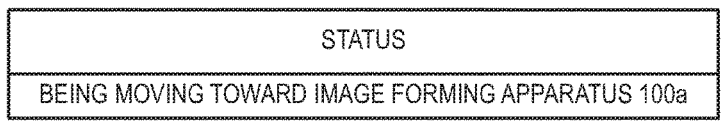

THE FIRST OF QUEUE

FIG.12B

EXECUTION QUEUE OF IMAGE FORMING APPARATUS 100b (AT THE TIME OF S404)

| JOB NO. | POST PROCESSING | STATUS |
|---|---|---|
| PRINT JOB 4 | NO | COMPLETION |
| PRINT JOB 5 | YES | WAIT |

THE FIRST OF QUEUE

FIG.12C

POST PROCESSING APPARATUS (S406)

| STATUS |
|---|
| CHANGE COURSE TOWARD IMAGE FORMING APPARATUS 100b |

FIG.15A

EXECUTION QUEUE OF IMAGE FORMING APPARATUS 100a

| JOB NO. | POST PROCESSING | STATUS | REQUIRED TIME | TIMING AT WHICH THE PRINT JOB BEING FIRST OF QUEUE |
|---|---|---|---|---|
| PRINT JOB 1 | NO | WAIT | 4 minutes | 0 minute later |
| PRINT JOB 2 | NO | WAIT | 5 minutes | 4 minutes later |
| PRINT JOB 3 | YES | WAIT | - | 9 minutes later |

FIG.15B

EXECUTION QUEUE OF IMAGE FORMING APPARATUS 100b

| JOB NO. | POST PROCESSING | STATUS | REQUIRED TIME | TIMING AT WHICH THE PRINT JOB BEING FIRST OF QUEUE |
|---|---|---|---|---|
| PRINT JOB 4 | NO | COMPLETION | 5 minutes | 0 minute later |
| PRINT JOB 5 | YES | WAIT | - | 5 minutes later |

IMAGE FORMING SYSTEM, POST
PROCESSING APPARATUS AND
NON-TRANSITORY COMPUTER-READABLE
STORAGE MEDIUM STORING PROGRAM
FOR INFORMATION PROCESSING
APPARATUS

CROSS-REFERENCE TO RELATED
APPLICATION

This U.S. patent application is entitled to and claims the benefit of Japanese Patent Application No. 2016-30075 filed on Feb. 19, 2016, the entire contents of which are incorporated herein by reference.

BACKGROUND OF THE INVENTION

Technical Field

The present invention relates to an image forming system, a post processing apparatus, and a non-transitory computer-readable storage medium storing a program for an information processing apparatus.

Description of Related Arts

An image forming apparatus may be connected with a post processing apparatus which performs post processing, such as binding processing and punching processing, for sheets on which images have been formed. Then, a post processing apparatus to be combined may be selected in accordance with the kind of required post processing, or a plurality of post processing apparatuses may be linked to a single image forming apparatus.

Under the environment where a plurality of image forming apparatuses are used in a single office, in the case where post processing is required to be performed at each of the plurality of image forming apparatuses, it is necessary to prepare a post processing apparatus for each of all the image forming apparatuses.

Japanese Unexamined Patent Publication No. 2006-321583 discloses a self-traveling finisher equipped with a traveling device capable of self-traveling. Upon receipt of a printing and delivery instruction from a user via a PC (personal computer), the self-traveling finisher receives printed sheets sent out from an image forming apparatus connected with the finisher. Then, the finisher separates from the image forming apparatus with the printed sheets held therein, self-travels, moves up to the PC of the user, and delivers the printed sheets to the user.

In an office where a plurality of image forming apparatuses are used, if a post processing apparatus is prepared for each of all the image forming apparatuses, it becomes possible to execute post processing at each of the image forming apparatuses. However, this arrangement becomes comparatively high in cost.

It may be considered that in accordance with a print job which uses a post processing apparatus, a single post processing apparatus is reconnected with an image forming apparatus which executes the print job. However, it is not realistic to perform the reconnection by a user himself/herself. Moreover, in the self-traveling finisher disclosed by the above patent publication, it is not taken into consideration to change a connection destination among a plurality of image forming apparatuses.

SUMMARY

The present invention has been achieved in view of the above-mentioned situations, and the objects of the present invention are to reduce the number of post processing apparatuses required as a whole so as to use a post processing apparatus effectively, and to shorten execution waiting time of a print job of a user due to moving of a self-traveling post processing apparatus.

To achieve at least one of the abovementioned objects, an image forming system reflecting one aspect of the present invention, includes a plurality of image forming apparatuses each of which includes an image forming section to perform image formation for a sheet based on print data of a print job and a communication section; a self-traveling post processing apparatus which separably connects with each of the plurality of image forming apparatuses and includes a post processing section to perform post processing for a sheet having been subjected to image formation, a traveling section to move the post processing apparatus itself, and a communication section to communicate with other apparatuses; and a processor configured such that in a case of having received a print job which is executed by any of the plurality of image forming apparatuses and performs the post processing, the processor makes the post processing apparatus move, by the traveling section, toward an image forming apparatus which executes the print job.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 11A is a diagram showing an execution queue of print jobs.

FIG. 11B is a diagram showing an execution queue of print jobs.

FIG. 11C is a diagram showing a status of a post processing apparatus.

FIG. 12A is a diagram showing an execution queue of print jobs.

FIG. 12B is a diagram showing an execution queue of print jobs.

FIG. 12C is a diagram showing a status of a post processing apparatus.

FIG. 15A is a diagram showing an execution queue of print jobs for an image forming apparatus 100a. FIG. 15B is a diagram showing an execution queue of print jobs for an image forming apparatus 100b.

DETAILED DESCRIPTION

Figure 1:
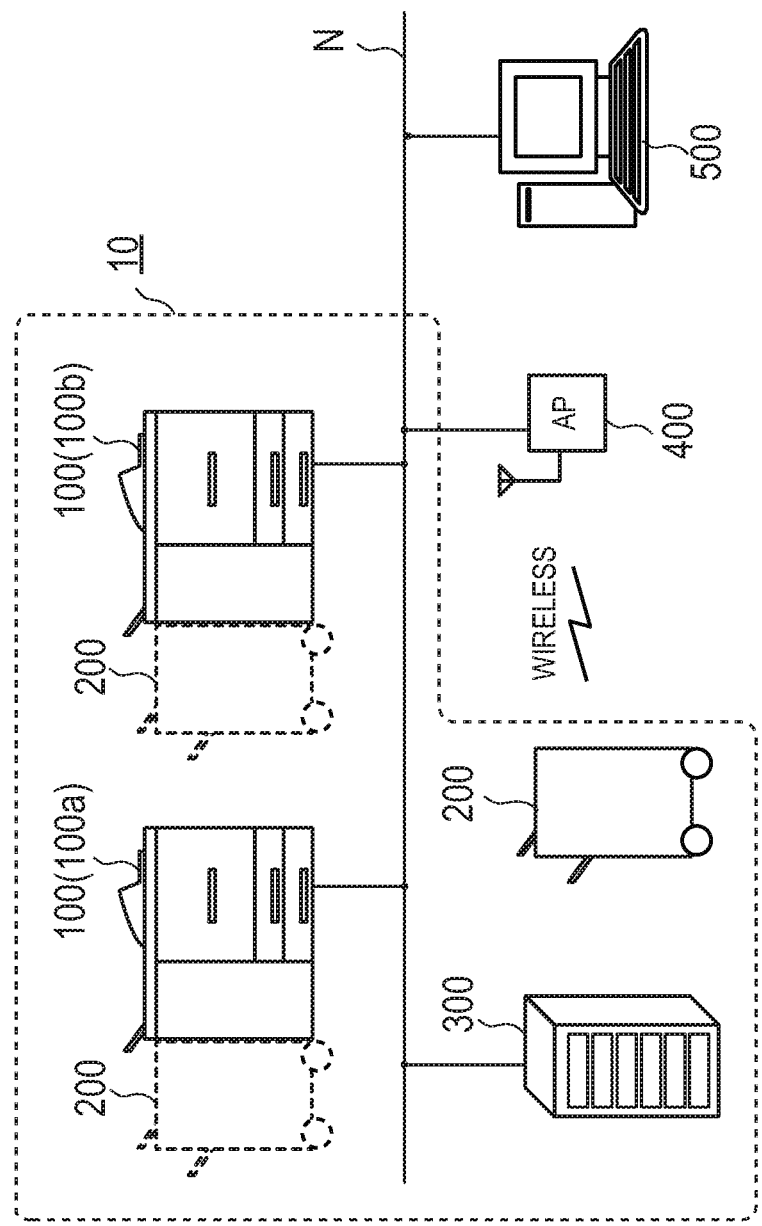
FIG. 1 is a diagram showing a whole constitution of an image forming system according to the first embodiment.

Hereinafter, an embodiment of the present invention will be described with reference to the attached drawings. In the description of the drawings, the same sign is given to the same element, and an overlapping description is omitted. Since a dimension ratio in the drawings is exaggerated on account of description, the ratio may be different from the actual ratio.

First Embodiment

Figure 2:
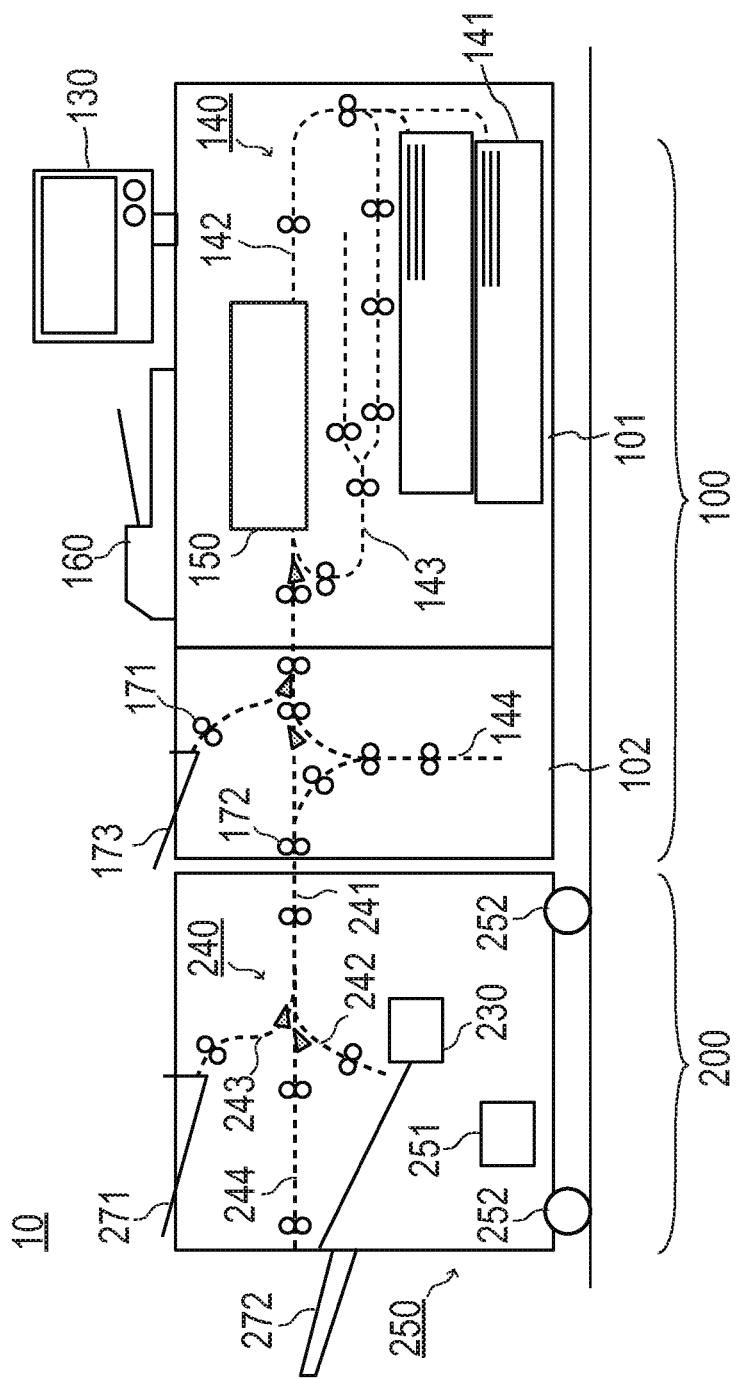
FIG. 2 is a diagram showing a cross sectional view of a main constitution of an image forming system.
Figure 3:
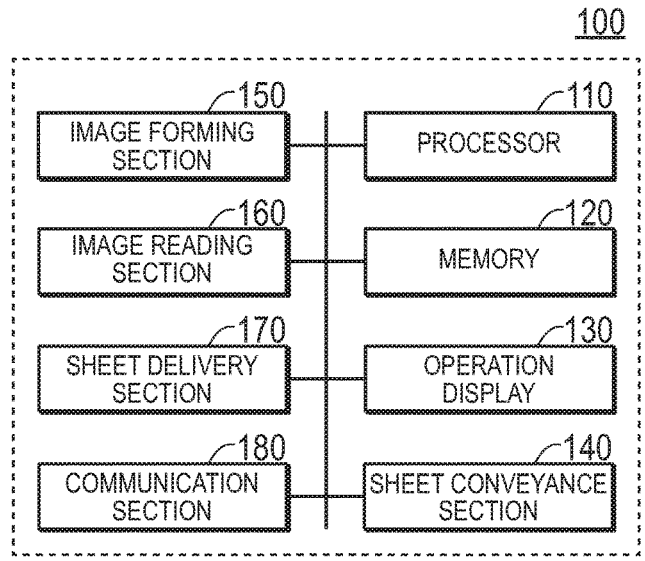
FIG. 3 is a block diagram showing a hardware constitution of an image forming apparatus.
Figure 4:
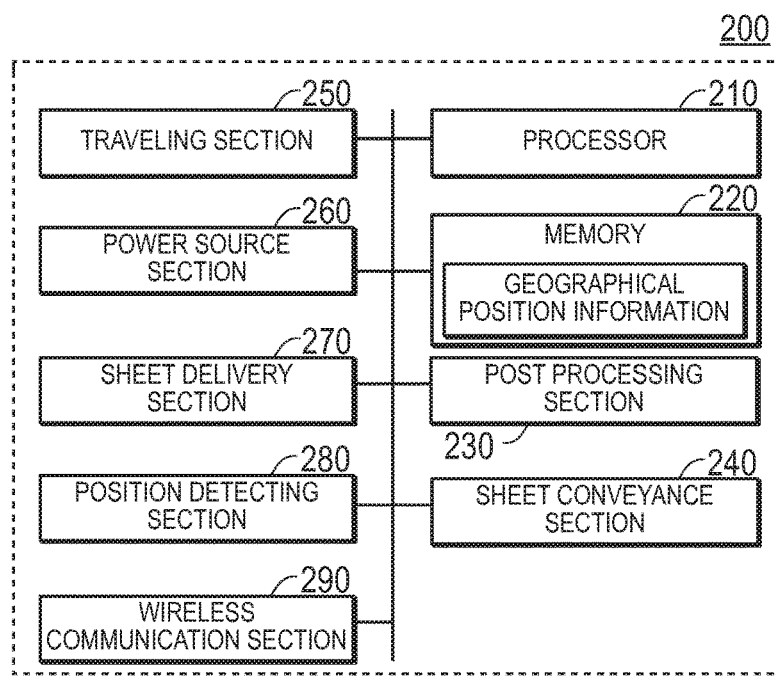
FIG. 4 is a block diagram showing a hardware constitution of a post processing apparatus.
Figure 5:
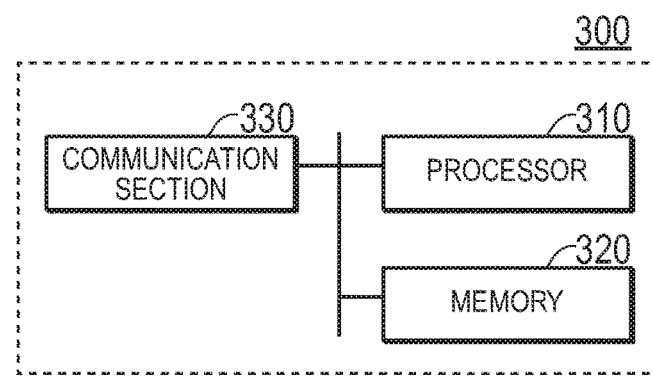
FIG. 5 is a block diagram showing a hardware constitution of a server.
Figure 6:
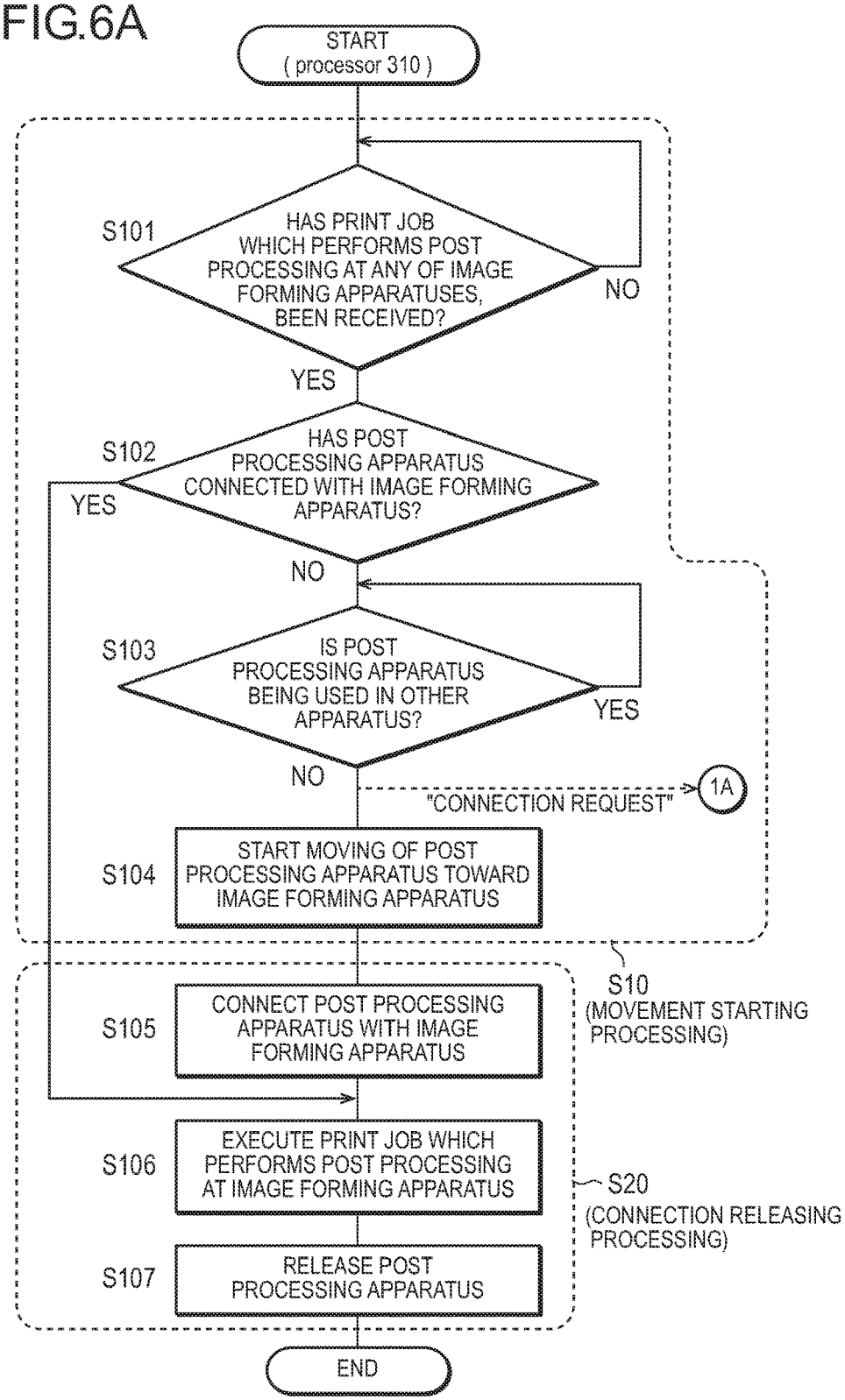
FIG. 6A is a flowchart showing print control executed by a processor of a server.
FIG. 6B is a flowchart showing movement control executed by a processor of a post processing apparatus at the time of executing the print control shown in FIG. 6A.

FIGS. 1 to 5 each is an illustration showing an example of a constitution of an image forming system 10 according to the present embodiment. FIG. 1 is an illustration showing a whole constitution of the image forming system 10 which includes a plurality of image forming apparatuses 100a and 100b, a post processing apparatus 200, and a server 300. FIG. 2 is an illustration showing a cross sectional view of a main constitution of the image forming system 10. FIGS. 3 to 5 are block diagrams showing respective hardware constitutions of the image forming apparatus 100a, the post processing apparatus 200, and the server 300.

The image forming apparatuses 100a and 100b each has the same constitution. Accordingly, hereinafter, a description is given only to a constitution of the image forming apparatus 100a, and a description for the other apparatus is omitted. Furthermore, hereinafter, in the case of designating a specific apparatus among a plurality of apparatuses, like the image forming apparatus 100a or the image forming apparatus 100b, an alphabet to designate the specific apparatus is attached after the sign of a number. On the other hand, in the case of designating an apparatus with a comprehensive concept, like the image forming apparatus 100, an alphabet is not attached.

(Image Forming System 10)
(1) Whole Constitution

As shown in FIG. 1 and FIG. 2, the image forming system 10 includes the plurality of image forming apparatus 100, the post processing apparatus 200, and the server 300. The post processing apparatus 200 is a self-traveling post processing apparatus which (mechanically) separably connects with any one of the plurality of image forming apparatuses 100, and at the time of connecting with any one of the image forming apparatus 100, the post processing apparatus 200 performs post processing for sheets which have been image-formed and are conveyed from the image forming apparatus 100. The image forming apparatus 100, the server 300, an access point 400, and a user terminal 500 are electrically connected with a network N employing a standard such as Ethernet (registered trademark) via cables or wirelessly so as to be able to communicate. The post processing apparatus 200 can communicate mutually with the image forming apparatus 100 and the server 300 via the access point 400 with wireless communication. The user terminal 500 is, for example, a PC (personal computer), and sends data for printing and a print job for pull print to the server 300 and sends a print job to the image forming apparatus 100.

(2) Image Forming Apparatus 100a

As shown from FIG. 1 to FIG. 3, the image forming apparatus 100a is constituted by a main body 101 and an inversion conveyor unit 102. The image forming apparatus 100a includes a processor 110, a memory 120, an operation display 130, a sheet conveyance section 140, an image forming section 150, an image reading section 160, a sheet delivery section 170, and a communication section 180, and these components are connected with each other with signal lines.

The processor 110 includes a CPU, a RAM, and a ROM, and reads out various kinds of programs stored in the ROM or the memory 120 appropriately and develops the programs into the RAM. Successively, the CPU executes the programs, thereby realizing various functions.

The memory 120 includes an HDD (hard disk drive), and stores various kinds of programs, image data for printing, and the like.

The operation display 130 includes, for example, a touch panel in which a touch sensor is superimposed on a liquid crystal display, displays a state of the image forming apparatus 100a for a user, and receives a print instruction from a user.

The sheet conveyance section 140 includes a plurality of sheet feed trays 141 to accommodate sheets, a sheet conveyance passage 142, a double-sided image formation conveyance passage 143, an inversion conveyance passage 144, a plurality of conveyance roller pairs, and a drive motor (not shown), and conveys sheets fed one sheet by one sheet from the sheet feed tray 141 to each section in the apparatus.

The image forming section 150 is, for example, an image forming section of an electrophotographying type, and includes a photoconductor drum, an electrification electrode, an exposure section, a developing section, a transfer section, a cleaning section, a fixing section, and so on. An electrostatic latent image formed on the photoconductor drum is developed by the developing section, thereby becoming a toner image. The toner image is transferred and fixed with heat on a sheet conveyed by the sheet conveyance section 140 so that an image is formed on the sheet.

The image reading section 160 is disposed on an upper part of the main body 101 of the image forming apparatus 100a, includes an optical system having mirrors, lenses, etc., and a reading sensor such as a CCD, reads out a document placed on a platen glass or a document conveyed by an ADF, and outputs image signals.

The sheet delivery section 170 includes a first sheet delivery section 171, a second sheet delivery section 172, a sheet delivery tray 173, and so on. In the case where the post processing apparatus 200 does not connect with, or in the case where post processing is not performed by the post processing apparatus 200, sheets are delivered to the outside of the apparatus via the first sheet delivery section 171, and stacked on the sheet delivery tray 173. In the case where post processing is performed by the post processing apparatus 200 having connected with, sheets are conveyed via the second sheet delivery section 172 to the post processing apparatus 200 located at a downstream side.

The communication section 180 is an interface to communicate with each apparatus via the network N. The communication section 180 may also have a wireless communication function by wireless communication standards such as Bluetooth (registered trademark), IEEE802.11, Home RF, IrDA, and may be constituted so as to communicate with the post processing apparatus 200 directly.

(3) Post Processing Apparatus 200

As shown in FIG. 1, FIG. 2, and FIG. 4, the post processing apparatus 200 includes a processor 210, a memory 220, a post processing section 230, a sheet conveyance section 240, a traveling section 250, a power source section 260, a sheet delivery section 270, a position detecting section 280, and a wireless communication section 290, and these components are connected with each other with signal lines.

The processor 210 includes a CPU, a RAM, and a ROM, and reads out various kinds of programs stored in the ROM or the memory 220 appropriately, and develops the programs into the RAM. Successively, the CPU executes the programs, thereby realizing various functions.

The memory 220 includes an HDD, and stores various kinds of programs and "geographical position information". The geographical position information is information regarding an arrangement of the image forming apparatuses 100a and 100b and the other image forming apparatuses which are set to be able to be connected with the post processing apparatus 200 and located in the same office. Examples of the geographical position information include an arrangement diagram of the respective image forming apparatuses in an office and information which shows the distance and direction of each of routes to connect these apparatuses.

The post processing section 230 performs side stitching processing as post processing. Sheets conveyed from the image forming apparatus 100 are placed on a placing stand. After the predetermined number of sheets have been placed, a bundle of placed sheets is subjected to matching processing. Thereafter, the bundle of sheets are stapled at positions located away by a predetermined distance from the edge of the bundle of sheets, whereby the bundle of sheets is subjected to side stitching so as to form a booklet. Herein, the post processing is not limited to the side stitching. It may be possible to use a post processing section which performs the other post processing, such as saddle stitching processing and punching processing.

The sheet conveyance section 240 includes the first to fourth conveyance passages 241, 242, 243, and 244, a plurality of conveyance roller pairs, and a drive motor (not shown), and conveys sheets conveyed from the second sheet delivery section 172 of the image forming apparatus 100 to each section in the apparatus.

The traveling section 250 includes a drive motor 251 and a plurality of wheels 252 which are driven by the drive motor 251 to rotate at right and left sides separately independently and in normal and reverse directions. The post processing apparatus 200 itself is made to self-travel with the traveling section 250.

When the post processing apparatus 200 connects with the image forming apparatus 100, the power source section 260 supplies electric power to the whole portion of the post processing apparatus 200 from commercial power source via the image forming apparatus 100. Furthermore, the power source section 260 includes a battery constituted by rechargeable lithium-ion batteries and the like. When the post processing apparatus 200 does not connect with the image forming apparatus 100, the battery supplies electric power to the processor 210, traveling section 250, and so on. While the post processing apparatus 200 connects with the image forming apparatus 100, the battery is charged with electric power from the commercial power source supplied from the image forming apparatus 100.

The sheet delivery section 270 includes a first sheet delivery tray 271 and a second sheet delivery tray 272. Sheets which are not subjected to post processing are delivered onto the first sheet delivery tray 271 via the third conveyance passage 243. Sheets having been applied with post processing by the post processing section 230, or sheets conveyed via the fourth conveyance passage 244 are delivered onto the second sheet delivery tray 272.

The position detecting section 280 detects the geographical position of the post processing apparatus 200 and the connecting state of the post processing apparatus 200 with the image forming apparatus 100. With regard to the geographical position, the position detecting section 280 grasps the position of the post processing apparatus itself successively by calculating a moving direction and an amount of movement based on an amount of rotation of each of the wheels 252 while the post processing apparatus 200 is moving. Furthermore, the position detecting section 280 includes a camera. The processor 210 recognizes the appearance of the image forming apparatus 100 from an image by a camera, performs positioning between the second sheet delivery section 172 of the image forming apparatus 100 and the first conveyance passage 241 of the post processing apparatus 200, and performs connecting both the apparatuses. Furthermore, the position detecting section 280 detects a state where the connecting of the post processing apparatus 200 with the image forming apparatus 100 has been completed electrically and mechanically, and outputs a connection completion status to the processor 210. Hereinafter, a state of having connected with an image forming apparatus electrically and mechanically is also merely referred to "having connected", and a state of not connecting is also merely referred to "not connecting". The processor 210 transmits having become "having connected" to the image forming apparatus 100 and the server 300. In a state of "having connected", communication with regard to control timing of sheets between the image forming apparatus 100 and the post processing apparatus 200 can be performed via signal lines with a cable by an unillustrated communication section.

The wireless communication section 290 wirelessly communicates with the access point 400 etc. connected with the network N by standards such as Bluetooth and IEEE802.11.

(4) Server 300

As shown in FIG. 1 and FIG. 5, the server 300 as an information processing apparatus includes a processor 310, a memory 320, and a communication section 330, and these components are connected with each other with signal lines. Since these constituting sections are equipped with hardware constitutions equivalent to the respective constituting sections of the image forming apparatus 100, descriptions for them are omitted.

The server 300 also functions as a pull print server, and executes pull print. The pull print is a function configured to correlate one or more print jobs received from the user terminal 500 with a user ID, to store them in the memory 320, and to transmit one or more print jobs selected by an instruction of a user through the operation display 130 of the image forming apparatus 100 to the image forming apparatus 100. Furthermore, the server 300 may transmit one or more selected print jobs to a predetermined image forming apparatus 100 without depending on an instruction of a user.

In the above image forming system 10, the self-traveling post processing apparatus 200 does not always connect with the image forming apparatus 100a, and can connect with the other image forming apparatus 100b. In the case where post processing is executed by any one of the image forming apparatus 100 and the other image forming apparatus of the image forming system 10, the post processing apparatus 200 moves up to the destination of the any one, and then executes a print job. By using such a self-traveling post processing apparatus 200, without preparing post processing apparatuses corresponding in number to all the image forming apparatuses, a print job which performs post processing at all the image forming apparatuses can be executed with a small number of post processing apparatuses. Furthermore, by sharing a single post processing apparatus among a plurality of image forming apparatuses, the operation ratio of the post processing apparatus is increased, and the post processing apparatus can be used efficiently.

Even in a state where the post processing apparatus 200 does not connect with, the image forming apparatus 100 can receive a print job which performs the post processing of this post processing apparatus 200. In the case of receiving such a print job, the image forming apparatus 100 or the server 300 transmits "a connection request" to the post processing apparatus 200. Based on this connection request, the post processing apparatus 200 moves up to the image forming apparatus 100 of the requester of the connection request, and executes post processing.

Hereinafter, in such the image forming system 10, even if a print job is received, since the post processing apparatus 200 does not connect with, there may be a case where the post processing is unable to be performed immediately. In such a case, in the present embodiment, in the case of having received a print job which performs post processing executed by any of a plurality of image forming apparatuses 100, the post processing apparatus 200 is controlled to move toward the image forming apparatus 100 which executes the print job. Hereinafter, with reference to FIGS. 6 to 9, print control according to the present embodiment will be described.

(Print Control)

FIG. 6A is a flowchart which shows print control executed mainly by the processor 310 of the server 300, and FIG. 6B is a flowchart which shows movement control executed by the processor 210 of the post processing apparatus 200 in parallel to the print control at the time of executing the print control shown in FIG. 6A.

As shown in FIG. 6A, firstly, the processor 310 determines whether a print job which is executed at any of the image forming apparatuses 100 and performs post processing by the post processing apparatus 200 has been received from a user via the user terminal 500 or the operation display 130 (S101). At this time, when a plurality of print jobs have been received at one time (hereafter, also referred to as "a job group"), the processor 310 determines whether a print job which performs post processing is included in the job group.

With regard to the reception of a print job, similarly to pull print, the server 300 may receive a print job and may transmit the print job to the image forming apparatus 100. Alternatively, the image forming apparatus 100 may receive a print job directly and may transmit the print job to the server 300 in response to a request to acquire the print job from the server 300 or automatically. In the following description, in any case, the description is given to a print job received by the image forming apparatus 100. Furthermore, the plurality of print jobs may be received at one time similarly to pull print, or may be received sequentially. In the latter case, at each time when a new print job is received, the new print job is stacked behind an execution queue, and processing subsequent to Step S101 is executed.

In the case where there is a print job which performs post processing (S101: YES), the processor 310 determines whether the post processing apparatus 200 has connected with the image forming apparatus 100 which has received the print job (S102).

Figure 7:
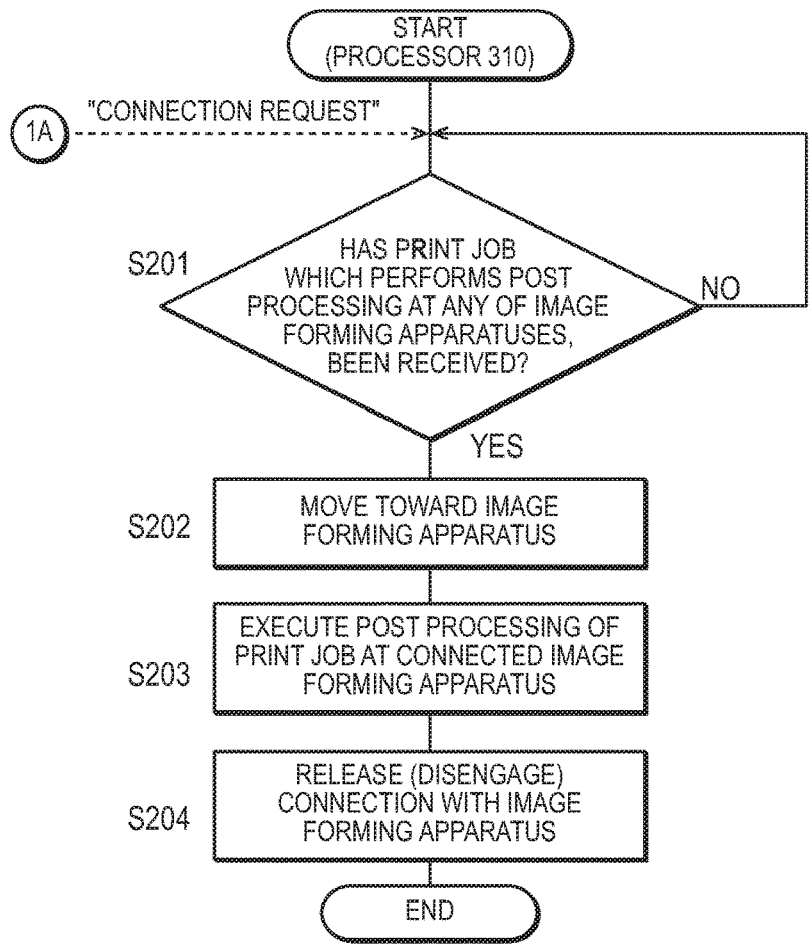
FIG. 7 is a diagram showing an example of a job group.

FIG. 7 shows an example of a job group received by the image forming apparatus 100. In this job group, a print job 3 which performs post processing is included together with print jobs 1 and 2 which do not perform post processing. In the case of having received a job group, as shown in FIG. 7, including a print job which performs post processing, the processor 310 runs processing subsequent to Step S102.

In the case where the post processing apparatus 200 has not connected with (S102: NO) and the post processing apparatus 200 is not being used at the other image forming apparatuses (S103: NO), the processor 310 transmits "a connection request" to the post processing apparatus 200 (In FIGS. 6A and 6B, shown with a sign "1A"). The post processing apparatus 200 starts, based on this connection request, moving up to the image forming apparatus 100 which has received the print job (S104). In the following description, movement starting processing of the post processing apparatus 200 in Steps S101 to S104 may be collectively called Step S10, and connection releasing processing in the later-mentioned Steps S105 to S107 may be collectively called Step S20.

Here, the processor 310 of the server 300 grasps the position of the post processing apparatus 200 and the connecting state of the post processing apparatus 200 with the image forming apparatus 100 successively by periodic communication. In the case where the server 300 or the image forming apparatus 100 does not grasp the position of the post processing apparatus 200 successively, in Step S103, the processor 310 may exchange message signals to confirm a connecting state with the post processing apparatus 200, whereby the connecting state may be made to be grasped.

After the post processing apparatus 200 has connected with the image forming apparatus (S105), or in the case where the post processing apparatus 200 has already connected when having received a print job (S102: YES), under control of the processor 310, the image forming apparatus 100 executes the print job which performs post processing, and performs image formation for sheets. Successively, the image forming apparatus 100 conveys the sheets having been subjected to the image formation from the second sheet delivery section 172 toward the post processing apparatus 200. The post processing apparatus 200 which has received the sheets applies post processing for the sheets in the post processing section 230, and delivers the sheets to the second sheet delivery tray 272 (S106).

After the print job which performs post processing has been completed, the post processing apparatus 200 is released from the image forming apparatus 100, and then the processing ends (S107, End).

(Movement Control on the Post Processing Apparatus 200 Side)

Next, with reference to FIG. 6B, processing of the processor 210 of the post processing apparatus 200 is described. Firstly, the processor 210 determines whether a print job which performs post processing at any of the image forming apparatuses 100 has been received. This determination may be performed, for example, by receiving a connection request (a sign "1A" in FIG. 6A) from the server 300 or the image forming apparatus 100. Herein, this connection request includes ID information to specify an image forming apparatus 100 which becomes a movement destination.

In the case of having received a print job which performs post processing (S201: YES), the processor 210 controls the traveling device 250 to operate and self-travel such that the post processing apparatus 200 itself is made to move toward the image forming apparatus 100 (S202). With regard to a direction and a distance in the movement, "geographical position information" stored in the position detecting section 280 and the memory 220 is utilized.

The post processing apparatus 200 moves up to the image forming apparatus 100 being a connection target, and connects with the image forming apparatus 100. Thereafter, the post processing apparatus 200 executes post processing for sheets conveyed from the image forming apparatus 100 (S203). After the print job which performs post processing has been completed, the post processing apparatus 200 releases the connection with the image forming apparatus 100, and the processing ends (S204, End). With this release (disengagement) of the connection, a flag showing "unused" stands for the post processing apparatus 200. Thereafter, it becomes possible to use the post processing apparatus 200 for the other image forming apparatuses 100.

In this way, according to the image forming system 10 of the present embodiment, a self-traveling post processing apparatus capable of performing post processing is shared among a plurality of image forming apparatuses, whereby it becomes possible to reduce the number of post processing apparatuses required as a whole. Furthermore, upon receipt of a print job, the post processing apparatus immediately starts moving toward an image forming apparatus which have received a print job which performs post processing. Accordingly, the post processing apparatus can be used effectively, and it becomes possible to shorten waiting time of a user for execution of a print job due to the moving of the self-traveling post processing apparatus.

Modification Embodiment

Figures 8, 9A, 9B:
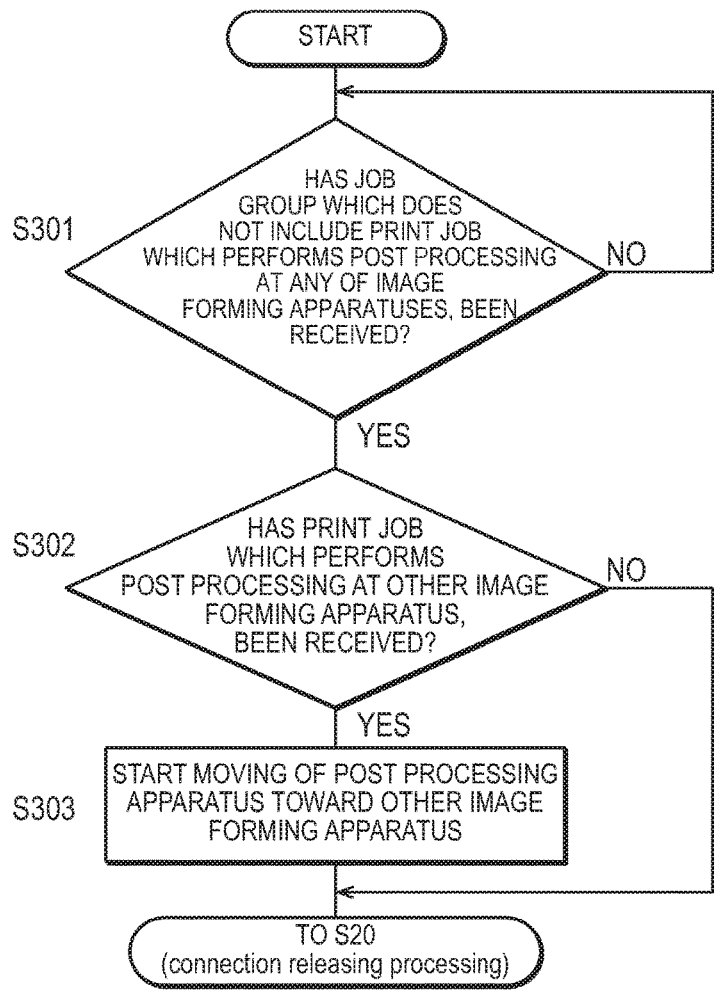
FIG. 8 is a flowchart showing print control executed by a processor of a server in a modification embodiment.
FIG. 9A shows an example of job groups received by a plurality of image forming apparatuses.
FIG. 9B shows an example of job groups received by a plurality of image forming apparatuses.

FIG. 8 is a flowchart showing print control executed by the processor 310 in a modification embodiment, and FIGS. 9A and 9B shows an example of a job group received by a plurality of image forming apparatuses 100.

Firstly, the processor 310 determines whether a job group which does not include a print job which performs post processing, has been received at any of the image forming apparatuses 100 (S301). For example, it is presumed that a job group, as shown in FIG. 9A, to be executed at the image forming apparatus 100b has been received. This job group does not include a print job which performs post processing (S301: YES).

Thereafter, the processor 310 determines whether a print job which performs post processing has been received at the other image forming apparatuses 100 (S302). For example, it is presumed that a job group, as shown in FIG. 9B, to be executed at the image forming apparatus 100a has been received. This job group includes a print job which performs post processing (S302: YES).

The processor 310 transmits "a connection request" to the post processing apparatus 200, and makes the post processing apparatus 200 start moving towards the other image forming apparatus 100a (S303). Hereinafter, the connection releasing processing in Step S20 in FIG. 6A is executed, and the post processing apparatus 200 is made to connect with the image forming apparatus 100a being a movement destination. Subsequently, print jobs in the job group are executed sequentially. Thereafter, the post processing apparatus 200 is released, and then the processing ends.

In the above description, the description has been given to an example where the processing in Step S301 and the processing in Step S302 are executed for the respective different image forming apparatuses. However, they may be applied for the same image forming apparatus. An example may be a case where the image forming apparatus 100b with which the post processing apparatus 200 does not connect, receives in Step S301 a print job which does not perform post processing and the same image forming apparatus 100b receives in the subsequent Step S302 a print job which performs post processing.

In this way, in the modification embodiment, in the case where a print job which performs post processing is not included in one or more print jobs received by one or more image forming apparatuses 100, thereafter, in the case of having received a print job which performs post processing, executed at any of the plurality of image forming apparatuses, the post processing apparatus is made to move toward an image forming apparatus which has received the print job which performs post processing, whereby the same effect as that in the first embodiment can be obtained.

Second Embodiment

In the first embodiment, after the post processing apparatus 200 has started moving toward an image forming apparatus 100 being a movement destination, the post processing apparatus 200 moves to the image forming apparatus 100 without any change, and executes post processing. In the second embodiment, in order to use the post processing apparatus 200 more efficiently, reconsideration and change are made for the movement destination in accordance with an event which has occurred during the moving. A constitution of the image forming system 10 according to the second embodiment is the same as that of the image forming system 10 according to the first embodiment unless specific description is made. Accordingly, the description for it is omitted.

Figure 10:
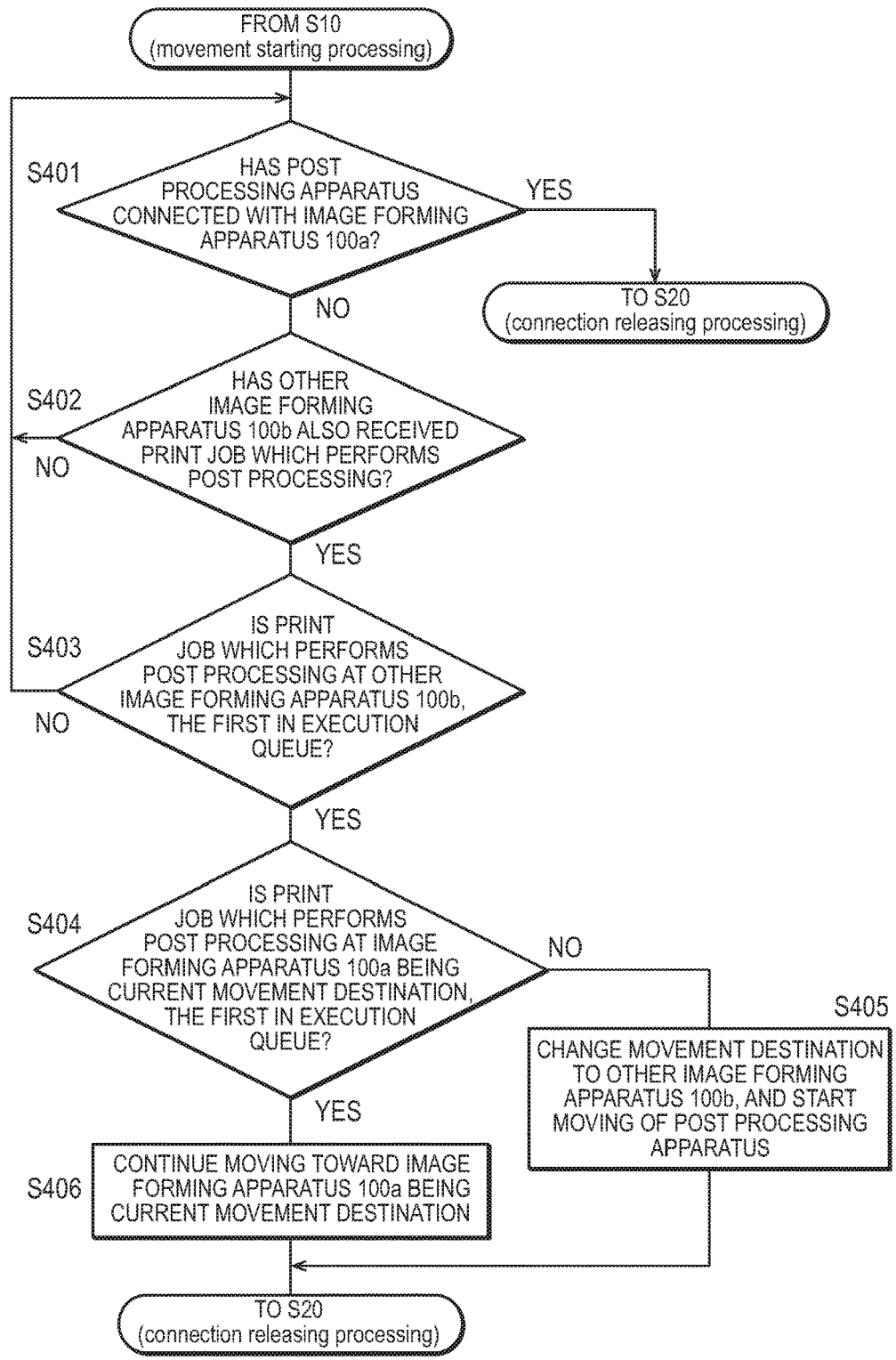
FIG. 10 is a flowchart showing print control executed by a processor of a server according to the second embodiment.

FIG. 10 is a flowchart showing print control executed mainly by the processor 310 of the server 300 according to the second embodiment. FIGS. 11A and 11B and FIGS. 12A and 12B are diagrams showing an execution queue of print jobs in the image forming apparatuses 100a and 100b, respectively, and FIG. 11C and FIG. 12C each is a diagram showing a status of the post processing apparatus 200. In the diagram showing an execution queue in each of FIGS. 11A and 11B and FIGS. 12A and 12B, a print job indicated at the upper portion in the table is located on the leading side, and a print job indicated at the lower portion is located on the trailing side.

FIG. 10 shows processing executed while the post processing apparatus 200 is moving to the image forming apparatus 100 being a movement destination in the movement starting processing in S10 shown in FIG. 6A. Herein, in FIG. 10, a description is given on the assumption that the image forming apparatus 100a is a current (initial) movement destination and the image forming apparatuses 100b is the other image forming apparatus.

In FIG. 10, firstly, in the case where the post processing apparatus 200 being in the course of moving has not connected with the image forming apparatus 100a being the current movement destination (S401: NO), the processor 210 determines whether the other image forming apparatus 100b has also received a print job which performs post processing. In the case where the other image forming apparatus 100b has also received the print job (S402: YES), the processing proceeds to the next processing in Step S403.

Herein, a description is given with reference to a specific example shown in FIGS. 11A, 11B and 11C. FIGS. 11A, 11B and 11C show respective states in apparatuses at the time of proceeding to Step S403 at the beginning. As shown in FIG. 11A, three print jobs 1 to 3 stand in the execution queue of the image forming apparatus 100a, and the print job 1 is the first print job in the queue. As shown in FIG. 11B, two print jobs 4 and 5 stand in the execution queue of the image forming apparatus 100b, and the print job 4 is the first print job in the queue. As shown in FIG. 11C, at this time, the post processing apparatus 200 is in the course of moving toward the image forming apparatus 100a being the current movement destination.

In the next Step S403, the processor 210 determines whether a print job which performs post processing at the other image forming apparatus 100b is "the first in the execution queue". As shown in FIG. 11B, the print job 4 at the first in the execution queue is a print job which does not perform post processing (S403: NO), and hereinafter, Step S401 and the subsequent processing are repeated.

In each of the image forming apparatuses 100a and 100b, since each of the first print jobs 1 and 4 in the respective execution queues is a print job which does not perform post processing, even if the post processing apparatus 200 is not connected, it is possible to execute these print jobs. The execution queue is updated successively. When execution of one print job is started, or completed, this print job is deleted from the updated execution queue. As a result, as shown in FIGS. 12A and 12B, the first print job in the execution queue becomes the print job 2 in the image forming apparatus 100a and the print job 5 in the image forming apparatus 100b, respectively. In FIGS. 12A and 12B, since the status of each of the first print jobs 1 and 4 becomes "completed", these print jobs are deleted from the execution queue, and are indicated with gray-out (light character).

In the state shown in FIG. 12B, since the print job 5 which performs post processing at the other image forming apparatus 100b becomes the first in the execution queue (S403: YES), next, the processor 310 determines whether a print job which performs post processing at the image forming apparatus 100a being the current movement destination is the first in the execution queue (S404). In the state shown in FIG. 12A, since the print job 3 which performs post processing is not the first in the execution queue (S404: NO), the movement destination is changed into the other image forming apparatuses 100b, and the post processing apparatus starts moving (S405). Hereafter, the connection releasing processing in Step S20 in FIG. 6A is executed, and then, the post processing apparatus 200 moves up to the image forming apparatus 100b, and the print job 5 has been completed.

Furthermore, on the other hand, in the case where a print job which performs post processing at the image forming apparatus 100a is also the first in the execution queue, the moving to the current movement destination is continued (S406). Hereafter, similarly, the connection releasing processing in Step S20 in FIG. 6A is executed, and then, the post processing apparatus 200 moves up to the image forming apparatus 100a without any change, and completes the remaining print jobs in the execution queue.

In this way, in the second embodiment, in the case where each of a plurality of image forming apparatuses receives a job group including a plurality of print jobs and each of the plurality of job groups includes a print job which performs post processing, the post processing apparatus is made to move toward an image forming apparatus in which a print job which performs post processing becomes the first print job in the execution queue. With this way, an effect equivalent to that of the first embodiment can be acquired. In particular, in the second embodiment, in the course of moving to the image forming apparatus 100a being the current (initial) movement destination, the movement destination is changed to the other image forming apparatuses 100b in which a print job which performs post processing earlier becomes the first job in the execution queue. With this, in the course of execution of another job by the image forming apparatus 100a which was the original movement destination, moving processing to make the post processing apparatus move to the other image forming apparatus 100b can be run in parallel to the execution. Accordingly, it becomes possible to shorten the whole print waiting time as the image forming system.

Third Embodiment

In the second embodiment, in the course of moving to an image forming apparatus being the current movement destination, in the case where a print job which performs post processing at a plurality of image forming apparatuses becomes the first in the execution queue of print jobs (S404: YES), the post processing apparatus moves to an image forming apparatus being the current (initial) movement destination without any change, and connects with the image forming apparatus (S406). In such a case, in the third embodiment, the movement destination is changed in accordance with a situation in consideration of the positional relationship among the respective apparatuses.

Figure 13:
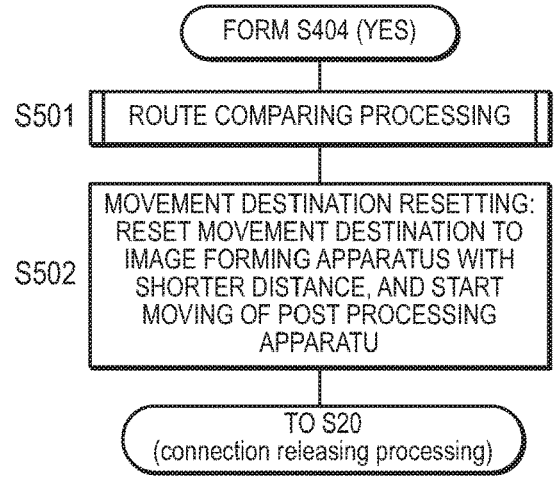
FIG. 13 is a flowchart showing print control executed by a processor of a server according to the third embodiment.

FIG. 13 is a flowchart showing print control executed mainly by the processor 310 of the server 300 according to the third embodiment. Similarly to Step S404 in FIG. 10, this is processing executed in the case where, in the course of moving to the image forming apparatus 100 being the current movement destination, a print job which performs post processing at a plurality of image forming apparatuses becomes the first in the execution queue of print jobs.

In the first step S501, the processor 310 compares routes from the post processing apparatus 200 to respective image forming apparatuses 100 in each of which a print job which performs post processing becomes the first in the execution queue of print jobs. In concrete terms, in the case where a print job which performs post processing becomes the first in the execution queue of print jobs in each of the image forming apparatuses 100a and 100b, the processor 310 compares routes. In the comparison of routes, the distance "a" of the route from the current position of the post processing apparatus 200 to the image forming apparatus 100a and the distance "b" of the route from the current position of the post processing apparatus 200 to the image forming apparatus 100b are calculated, separately. In this calculation, the current position information output from the position detecting section 280 and the "geographical position information" of each of the image forming apparatuses 100 stored in the memory 220 are used.

For example, in the case where the distance "a" of the route from the current position of the post processing apparatus 200 to the image forming apparatus 100a is 20 m and the distance "b" of the route to the image forming apparatus 100b is 10 m, the distance to the image forming apparatus 100b is shorter. In the next Step S502, the image forming apparatus 100b with the shorter distance is reset to the movement destination, and the post processing apparatus starts moving toward the set image forming apparatus 100b. Hereafter, the connection releasing processing in Step S20 in FIG. 6A is executed, and then, the post processing apparatus 200 connects with the image forming apparatus 100b being the movement destination, and completes a print job which performs post processing and stands at the first in the execution queue. In the above description, the determination is made based on a distance to each image forming apparatus 100. However, the determination may be made based on a time until the post processing apparatus 200 reaches each image forming apparatus 100.

In this way, in the third embodiment, in the case where a print job which performs post processing at a plurality of image forming apparatuses becomes the first print job in an execution queue, the post processing apparatus is made to move towards an image forming apparatus with the shortest distance. Accordingly, in addition to the effect in the second embodiment, the post processing apparatus is used still more efficiently, and it becomes possible to shorten the whole print waiting time as the image forming system.

Fourth Embodiment

In the second and third embodiments, at a time when the first print job in the execution queue in a plurality of image forming apparatuses 100 has become a print job which performs post processing, the movement destination of the post processing apparatus 200 is changed. In the fourth embodiment, at an earlier time point, in concrete terms, at a time point when print jobs which perform post processing at a plurality of image forming apparatuses 100 have been received, the movement destination of the post processing apparatus 200 is reset.

Figure 14:
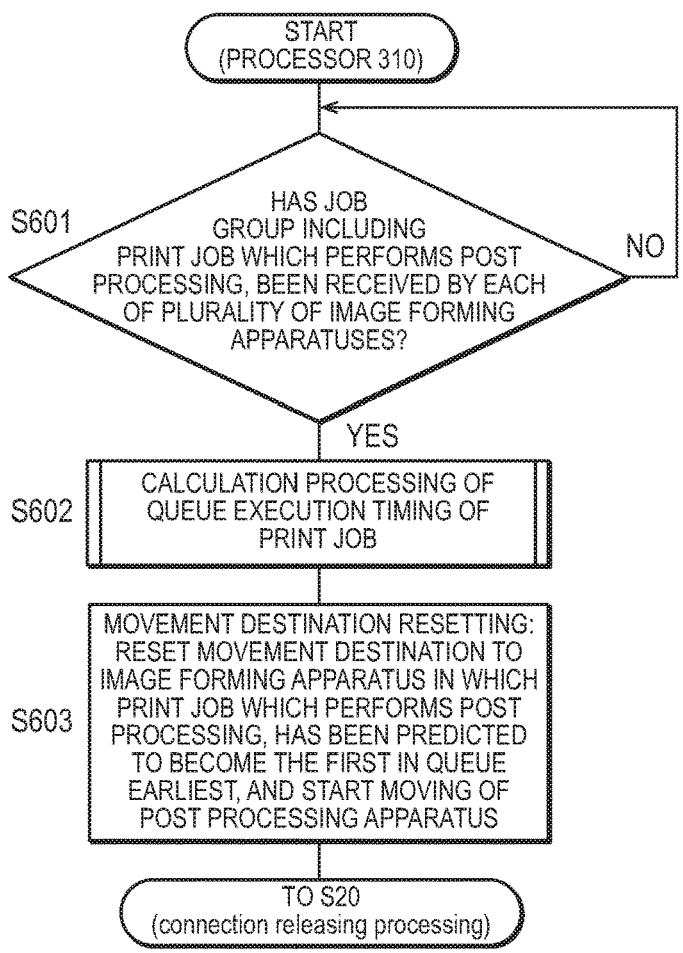
FIG. 14 is a flowchart showing print control executed by a processor of a server according to the fourth embodiment.

FIG. 14 is a flowchart showing print control executed mainly by the processor 310 of the server 300 according to the fourth embodiment.

Firstly, in the case where each of a plurality of image forming apparatuses has received a job group including a print job which performs post processing (S601: YES), secondly, the processor 310 performs calculation processing of the execution timing of the execution queue of print jobs (S602).

FIGS. 15A and 15B are diagrams showing the execution queues of print jobs in the image forming apparatuses 100a and 100b, respectively. As shown in FIGS. 15A and 15B, in Step S602, the processor 310 calculates processing time and time until becoming the first in the execution queue for each print job. In this calculation, the above processing time and time can be calculated based on specification described on a job ticket of each print job, such as a sheet size, print settings with regard to one side print/both side print and color print/mono color print, print information with regard to propriety/kind of post processing, and the number of print sheets; and the processing capabilities (processing rates) of each of the image forming apparatus 100 and the post processing apparatus 200 previously stored in the memories 120 and 220. In an example shown in FIGS. 15A and 15B, the print job 3 which performs post processing becomes the first print job in the execution queue after nine minutes, and the print job 5 becomes the first print job in the execution queue after five minutes. Therefore, the print job 5 of the image forming apparatus 100b becomes the first print job in the execution queue earliest. From this matter, it is predicted that the image forming apparatus 100 in which a print job which performs post processing becomes the first print job in the execution queue earliest is the image forming apparatus 100b.

Accordingly, at Step S603, the processor 310 sets the image forming apparatus 100b as a movement destination, and makes the post processing apparatus 200 start moving to the image forming apparatus 100b. Hereafter, the connection releasing processing in Step S20 in FIG. 6A is executed, and then, the post processing apparatus 200 connects with the image forming apparatus 100b being the movement destination, and print jobs in the execution queue are executed sequentially.

In this way, in the fourth embodiment, in the case where each of a plurality of image forming apparatuses receives a job group including a plurality of print jobs and each of the plurality of print groups includes a print job which performs post processing, the processor 310 predicts a timing at which a print job which performs post processing becomes the first print job in the execution queue. Then, the processor 310 makes the post processing apparatus move towards the image forming apparatus in which a print job which performs the post processing has been predicted to become the first print job in the execution queue earliest. In the fourth embodiment, in addition to the effect of each of the second and third embodiments, the post processing apparatus can be used still more efficiently, and it becomes possible to shorten the whole print waiting time as the image forming system.

Other Modification Embodiment

In the above-mentioned embodiments, an example is shown in such a manner that the processor 310 of the server 300 became a main constituent and performs print control cooperatively with the processor 110 of the image forming apparatus 100 and the processor 210 of the post processing apparatus 200. However, the present invention should not be limited to this example, and the server 300 may be omitted. For example, a part of the function of the processor 310 of the server 300 is incorporated into the processor 110 of the image forming apparatus 100 or the processor 210 of the post processing apparatus 200, and one of the processor 110 and the processor 210 becomes a main constituent, and cooperates with the other one, thereby performing the whole print control of the image forming system constituted by the image forming apparatus 100 and the post processing apparatus 200.

Furthermore, in S20 (connection releasing processing) in FIG. 6A, an example is described such that after a print job which uses the post processing apparatus 200 and stands in the execution queue of the image forming apparatus 100 being a connection destination has been completed, the post processing apparatus 200 is released immediately. After this release, the post processing apparatus 200 may be made to move to a preset waiting position, or may be made to wait at the position while connecting with the image forming apparatus 100 used immediately before.

Furthermore, in the embodiment shown in FIG. 1, the image forming system 10 equipped with the two image forming apparatuses 100a and 100b is exemplified. However, the image forming system 10 may be equipped with three or more image forming apparatuses.

Furthermore, programs which makes the image forming system operate may be provided by a computer readable storage medium, such as a USB memory, a flexible disk, a CD-ROM, or may be provided via on-line through networks, such as Internet. In this case, the programs stored in the computer-readable storage medium are usually transferred to a memory, a storage, etc., and are stored in them. Further, the programs may be provided, for example, as independent application software, or may also be incorporated in software of each apparatus as one function of the image forming system.

In addition, the present invention is restrictively interpreted by only claims, and should not be restrictively interpreted by the constitution examples of the apparatuses of the present embodiment mentioned above, the assumed examples, and so on.

What is claimed is:

1. An image forming system, comprising:
a plurality of image forming apparatuses each of which includes an image forming section to perform image formation for a sheet based on print data of a print job and a communication section;
a self-traveling post processing apparatus which separably connects with each of the plurality of image forming apparatuses and includes a post processing section to perform post processing for a sheet having been subjected to image formation, a traveling section to move the post processing apparatus itself, and a communication section to communicate with other apparatuses; and
a processor configured such that in a case of having received a print job which is executed by any of the plurality of image forming apparatuses and performs the post processing, the processor makes the post processing apparatus move, by the traveling section, toward an image forming apparatus which executes the print job.

2. The image forming system as claimed in claim 1, wherein in a case where the received print job does not include a print job which perform the post processing, and thereafter, in a case of having received a print job which is executed by any of the plurality of image forming apparatuses and performs the post processing, the processor makes the post processing apparatus move toward the image forming apparatus which executes the print job which performs the post processing.

3. The image forming system as claimed in claim 1, wherein in a case where the received print job is a plurality of job groups, each job group including a plurality of print jobs, executed by respective image forming apparatuses of the plurality of image forming apparatuses and each of the plurality of job groups includes a print job which performs the post processing, the processor makes the post processing apparatus move toward the image forming apparatus in which a print job which performs the post processing has become the first print job in an execution queue.

4. The image forming system as claimed in claim 3, further comprising:
a memory storing geographical position data of the plurality of image forming apparatuses; and a position detecting section to detect a geographical position of the post processing apparatus,
wherein in a case where a print job which performs the post processing has become the first print job in an execution queue in a plurality of image forming apparatuses, the processor compares respective distances or respective movement times from the plurality of image forming apparatuses to the post processing apparatus based on the geographical position data and the geographical position of the post processing apparatus detected by the position detecting section, and makes the post processing apparatus move toward the image forming apparatus with the shortest distance or the shortest movement time.

5. The image forming system as claimed in claim 1, wherein in a case where the received print job is a plurality of job groups, each job group including a plurality of print jobs, executed by respective image forming apparatuses of the plurality of image forming apparatuses and each of the plurality of job groups includes a print job which performs the post processing, the processor predicts a timing at which a print job which performs the post processing becomes the first print in an execution queue, and makes the post processing apparatus move toward the image forming apparatus in which a print job which performs the post processing has been predicted to become the first print job in an execution queue earliest.

6. A post processing apparatus which separably connects with each of a plurality of image forming apparatuses which perform image formation for a sheet, comprising:
a post processing section to perform post processing for a sheet having been subjected to image formation;
a traveling section to move the post processing apparatus itself;
a communication section to communicate with other apparatuses; and
a processor configured such that in a case of having received a print job which is executed by any of the plurality of image forming apparatuses and performs the post processing, the processor makes the post processing apparatus move, by the traveling section, toward an image forming apparatus which executes the print job.

7. The post processing apparatus as claimed in claim 6, wherein in a case where the received print job does not include a print job which perform the post processing, and thereafter, in a case of having received a print job which is executed by any of the plurality of image forming apparatuses and performs the post processing, the processor makes the post processing apparatus move toward the image forming apparatus which executes the print job which performs the post processing.

8. The post processing apparatus as claimed in claim 6, wherein in a case where the received print job is a plurality of job groups, each job group including a plurality of print jobs, executed by respective image forming apparatuses of the plurality of image forming apparatuses and each of the plurality of job groups includes a print job which performs the post processing, the processor makes the post processing apparatus move toward the image forming apparatus in which a print job which performs the post processing has become the first print job in an execution queue.

9. The post processing apparatus as claimed in claim 8, further comprising:
a memory storing geographical position data of the plurality of image forming apparatuses; and
a position detecting section to detect a geographical position of the post processing apparatus,
wherein in a case where a print job which performs the post processing has become the first print job in an execution queue in a plurality of image forming apparatuses, the processor compares respective distances or respective movement times from the post processing apparatus to the plurality of image forming apparatuses based on the geographical position data and the geographical position of the post processing apparatus detected by the position detecting section, and makes the post processing apparatus move toward the image forming apparatus with the shortest distance or the shortest movement time.

10. An image forming system, comprising:
the post processing apparatus described in claim 6; and
a plurality of image forming apparatuses each of which is separably connected with the post processing apparatus and performs image formation for a sheet.

11. A non-transitory computer-readable storage medium storing a program for causing an information processing apparatus to execute a process of controlling a plurality of image forming apparatuses each of which performs image formation for a sheet based on print data of a print job and a self-travelling post processing apparatus which performs post processing for a sheet subjected to image formation and separably connects with each of the plurality of image forming apparatuses, the process comprising:
- a step of receiving a print job which is executed by any of the plurality of image forming apparatuses and performs the post processing; and
- a step of moving the post processing apparatus, by the traveling section to move the post processing apparatus itself, toward an image forming apparatus which executes the print job received in the receiving step.

12. The non-transitory computer-readable storage medium as claimed in claim 11, wherein in the moving step, in a case where the received print job does not include a print job which perform the post processing, and thereafter, in a case of having received a print job which is executed by any of the plurality of image forming apparatuses and performs the post processing, the post processing apparatus moves toward the image forming apparatus which executes the print job which performs the post processing.

13. The non-transitory computer-readable storage medium as claimed in claim 11, wherein in the moving step, in a case where the received print job is a plurality of job groups, each job group including a plurality of print jobs, executed by respective image forming apparatuses of the plurality of image forming apparatuses and each of the plurality of job groups includes a print job which performs the post processing, the post processing apparatus moves toward the image forming apparatus in which a print job which performs the post processing has become the first print job in an execution queue.

14. The non-transitory computer-readable storage medium as claimed in claim 13, wherein the post processing apparatus further comprises: a memory storing geographical position data of the plurality of image forming apparatuses; and a position detecting section to detect a geographical position of the post processing apparatus,
- wherein in the moving step, in a case where a print job which performs the post processing has become the first print job in an execution queue in a plurality of image forming apparatuses, respective distances or respective movement times from the plurality of image forming apparatuses to the post processing apparatus are compared based on the geographical position data and the geographical position of the post processing apparatus detected by the position detecting section, and the post processing apparatus moves toward the image forming apparatus with the shortest distance or the shortest movement time.

15. The non-transitory computer-readable storage medium as claimed in claim 11, wherein in a case where the received print job is a plurality of job groups, each job group including a plurality of print jobs, executed by respective image forming apparatuses of the plurality of image forming apparatuses and each of the plurality of job groups includes a print job which performs the post processing, in the moving step, a timing at which a print job which performs the post processing becomes the first print in an execution queue is predicted, and the post processing apparatus moves toward the image forming apparatus in which a print job which performs the post processing has been predicted to become the first print job in an execution queue earliest.

* * * * *